United States Patent [19]

Hubel et al.

[11] Patent Number: 6,038,339
[45] Date of Patent: Mar. 14, 2000

[54] WHITE POINT DETERMINATION USING CORRELATION MATRIX MEMORY

[75] Inventors: Paul M. Hubel, Mountain View, Calif.; Graham Finlayson, Stonehaven, United Kingdom

[73] Assignee: Hewlett-Packard Company, Palo Alto, Calif.

[21] Appl. No.: 08/971,053

[22] Filed: Nov. 14, 1997

[51] Int. Cl.[7] .............................. G06K 9/00; G06K 9/40; H04N 1/46; G03F 3/08
[52] U.S. Cl. ........................ 382/162; 382/274; 358/516; 358/518
[58] Field of Search ................................... 382/162, 167, 382/274; 358/518, 520, 516; 345/431; 348/223, 227, 189, 655

[56] References Cited

U.S. PATENT DOCUMENTS

| | | | |
|---|---|---|---|
| 5,351,079 | 9/1994 | Usui | 348/223 |
| 5,448,502 | 9/1995 | Kindo et al. | 364/526 |
| 5,864,834 | 1/1999 | Arai | 706/16 |
| 5,907,629 | 5/1999 | Funt et al. | 382/162 |

OTHER PUBLICATIONS

Brian A. Wandell; "The Synthesis and Analysis of Color Images"; IEEE Transactions on Patt. Anal. and Mach. Intell. PAMI–9, pp. 2–13, (1987).

Masato Tsukada, et al,; "An Approach to Color Constancy Using Multiple Images"; IEEE Comp. Soc., (1990).

Brian V. Funt, et al.; "Color Constancy Computation in Near–Mondrian Scenes using a Finite Dimensional Linear Model"; IEEE Computer Vision and Pattern Recognition Proceedings, pp. 544–549, (1988).

Michael D'Zmura; "Color Constancy: Surface color from changing illumination", JOSA(9), pp. 490–493, (1992).

Laurence T. Maloney, et al. "Color Constancy: A method for recovering surface spectral reflectance", J. Opt. Soc. Am. A, pp. 29–33, (1986).

Shoji Tominaga; "Standard surface–reflectance model and illuminant estimation", J. Opt. Soc. Am. A (6), pp. 576–584, (1989).

Edwin H. Land; "Recent Advances in Retinex Theory"; Vision Research (26) , pp. 7–21 (1986).

Edwin H. Land; "The Retinex Theory of Color Vision"; Scientific American, pp. 108–129 (1977).

D. A. Forsyth; "A Novel Algorithm for Color Constancy"; IJVC(5), pp. 5–36 (1990).

(List continued on next page.)

Primary Examiner—Thomas D. Lee
Assistant Examiner—Wenpeng Chen

[57] ABSTRACT

Color digital imaging quality is improved by quickly, accurately and robustly estimating illuminant information associated with a color digital image to correct color of the image based on the illuminant. A "correlation matrix memory" or "associative matrix memory" is used to achieve identical results to the Color in Perspective method, and to improve it by adding Bayesian or other correlation statistics. The new method is insensitive to aperture colors and provides an effective framework on top of estimation. It will effortlessly return the maximum likelihood answer. A correlation matrix memory is built to correlate the data from any picture image to reference images under a range of illuminants. When a camera, scanner, or the like, produces a picture image, the data is converted to chromaticity and a vector is created corresponding to the values existing in the scene. This vector is multiplied by each column in the correlation matrix giving a new matrix. Each column is then summed, and the resulting values form a vector that represents the likelihood of each reference source being the illuminant of the scene. The vector values can be density plotted where each value is plotted at the chromaticity of the illumination for that particular column. From this plot normal statistical methods can be used to estimate the likely illumination of the scene. Greatly reduced computational requirements result because simple binary matrix algorithms replace complex geometrical calculations

28 Claims, 6 Drawing Sheets

OTHER PUBLICATIONS

G. D. Finlayson; "Color in Perspective"; IEEE Transactions on Pattern Analysis and Machine Intelligence, pp. 1034–1038 (1996).

David H. Brainard; "Analysis of the Retinex Theory of Color Vision"; J. Opt. Soc. Am. A(36), pp. 1651–1661 (1986).

David H. Brainard; "Bayesian Method for Reconstructing Color Images from Trichromatic Samples"; Proceedings of the IS&T Annual Meeting, (1994).

Brian V. Funt; "Learning Color Constancy"; 4th IS&T and SID Color Imaging (1996).

Paul M. Hubel, et al.; "Sharp Transformations for Color Appearance"; Accepted for publication and presentation at SPIE Electronic Imaging Conference: Device Independent Color, San Jose, CA (1998).

M. D'Zmura; "Probabilistic Color Constancy"; in Geometric Representations of Perceptual Phenomena: Papers in Honor of Tarow Indow's 70th Birthday, ed. R.D. Luce, et al., Lawrence Erlbaum Associates (1994).

G. D. Finlayson; "Color Constancy in Diagonal Chromaticity Space"; IEEE Computer Society: Proceedings of the Fifth International Conference on Computer, pp. 218–223 (1995).

Michael D'Zmura; "Color Constancy. I. Basic theory of two–stage linear recovery of spectral descriptions for lights and surfaces"; J. Opt. Soc. Am. A(10), pp. 2148–2165 (1993).

Kobus Barnard; "Computational Color Constancy: Taking Theory into Practice"; MSc Thesis, Simon Fraser University, School of Computing (1995).

Figure 4

|  | il1 | il2 | il3 | il4 | il5 | il6 | il7 | il8 |
|---|---|---|---|---|---|---|---|---|
| $x_1y_1$ | 0 | 0 | 0 | 0 | 0 | 0 | 0 | 0 |
| $x_1y_2$ | 0 | 0 | 0 | 0 | 0 | 0 | 0 | 0 |
| $x_1y_3$ | 0 | 1 | 1 | 1 | 0 | 1 | 0 | 0 |
| ... | 1 | 1 | 0 | 0 | 0 | 0 | 0 | 0 |
| ... | 0 | 0 | 1 | 0 | 1 | 1 | 1 | 0 |
| $x_1y_n$ | 0 | 0 | 0 | 0 | 0 | 0 | 0 | 0 |
| $x_2y_1$ | 0 | 1 | 1 | 1 | 0 | 0 | 0 | 1 |
| $x_2y_2$ | 1 | 1 | 0 | 1 | 0 | 1 | 0 | 0 |
| ... | 0 | 0 | 1 | 0 | 0 | 0 | 0 | 0 |
| ... | 1 | 1 | 1 | 1 | 1 | 1 | 1 | 0 |
| ... | 0 | 0 | 0 | 0 | 0 | 0 | 0 | 0 |
| ... | 0 | 0 | 0 | 0 | 0 | 0 | 0 | 0 |
| ... | 0 | 1 | 1 | 0 | 1 | 1 | 1 | 0 |
| $x_ny_n$ | 0 | 0 | 0 | 0 | 0 | 0 | 0 | 0 |
| SUM 427B | 4 | 7 | 5 | 3 | 2 | 4 | 4 | 1 |

INTERMEDIATE MATRIX 427A

WHITE POINT DETERMINATION USING CORRELATION MATRIX MEMORY

BACKGROUND OF THE INVENTION

1. Field of the Invention

The present invention relates to digital image processing and, more particularly, to white-point estimation for color digital images.

2. Description of the Related Art

Under a large variety of scene illuminants, a human observer sees the same range of colors; a white piece of paper remains resolutely white independent of the color of light under which it is viewed. In contrast, color imaging systems (e.g., digital cameras) are less color constant in that they will often infer the color of the scene illuminant incorrectly. Unless the color constancy problem is solved, color appearance models cannot be used to guide image processing, and such processing is necessary for accurate (and acceptable) color reproduction.

In our work on testing color appearance models we have found that several of the color appearance models perform well when asked to compensate for a range of illuminants. See, P. M. Hubel and G. D. Finlayson, "Sharp Transforms for Color Appearance", Accepted for publication and presentation at SPIE Electronic Imaging Conference: Device Independent Color, San Jose, Calif., (1998). The main factor prohibiting the use of such models in digital photography (and probably most other applications) is the requirement that the color of the scene illumination must be known. In most situations, we simply do not have this information.

In processing the digital camera image, we must either measure the color of the scene illumination or estimate its color from the image data. Of course, in working on digital imaging systems, it is not practical to have an illumination sensor and expect users to calibrate to a white reference. If biological imaging systems achieve color constancy without an illumination color sensor, then it should be possible for us to achieve color constancy from just the image data (otherwise we would have evolved with spectrophotometers and white reference tiles mounted on our foreheads!).

Many solutions have been proposed for the white-point estimation problem. Land, Buchsbaum, Gershon, and others, proposed that the average color of a scene is gray and so the white-point chromaticity corresponds to the average image chromaticity (we refer to this method as Gray World). See, E. H. Land, "Recent Advances in Retinex Theory", Vision Research, 26, p. 7–21, (1986); G. Buchsbaum, "A Spatial Processor Model for Object Color Perception", Journal of the Franklin Institute 310, p. 1–26 (1980); and, R. Gershon, A. D. Jepson and J. K. Tsotsos, "From [R,G,B] to Surface Reflectance: Computing Color Constant Descriptors in Images", Perception, p. 755–758 (1988). Land proposed that the maximum pixel responses, calculated in the red, green, and blue color channels individually, can also be used as a white-point estimate (we refer to this method as Max.RGB). See, E. H. Land, "The Retinex Theory of Color Vision," Scientific American, p. 108–129, (1977).

Maloney, Wandell, D'Zmura, Iverson, Funt, Drew, and others, have formulated the white-point estimation problem as an equation-solving exercise. See, L. T. Maloney and B. A. Wandell, "Color Constancy: a Method for Recovering Surface Spectral Reflectance", J. Opt. Soc. Am. A, p. 29–33, (1986); B. A. Wandell, "The Synthesis and Analysis of Color Images", IEEE Trans. Patt. Anal. and Mach. Intell. PAMI-9, p. 2–13, (1987); M. D'Zmura, "Color Constancy: Surface Color from Changing Illumination", J. Opt. Soc. Am. A (9), p. 490–493 (1992); M. D'Zmura and G. Iverson, "Color Constancy. I. Basic Theory of Two-stage Linear Recovery of Spectral Descriptions for Lights and Surfaces", J. Opt. Soc. Am. A (10), p. 2148–2165 (1993); and, B. V. Funt and M. S. Drew, "Color Constancy Computation in Near-Mondrian Scenes Using a Finite Dimensional Linear Model", IEEE Computer Vision and Pattern Recognition Proceedings, p. 544–549, (1988).

In contrast, Tominaga, Wandell, Funt, Tsukada, Drew, and others, have shown that in principle the white-point might be found by exploiting the physics of the world, for example by finding specularity or interreflection regions in images. See, S. Tominaga and B.A. Wandell, "Standard Surface-Reflectance Model and Illuminant Estimation", J. Opt. Soc. Am. A, (6), p. 576–584, (1989); B. V. Funt, M. S. Drew and J. Ho, "Color Constancy from Mutual Reflection", IJCV, (6), p. 5–24 (1991); M. Tsukada and Y. Ohta, "An Approach to Color Constancy Using Multiple Images", IEEE Comp. Soc, (1990); and, M. S. Drew, "Optimization Approach to Dichromatic Images", Journal of Mathematical Imaging, (1993).

All these methods are similar, however, in the respect that they afford poor estimation performance. See, D. A. Brainard and B. A. Wandell, "Analysis of the Retinex Theory of Color Vision", J. Opt. Soc. Am. A (36), p. 1651–1661, (1986); G. D. Finlayson, "Color Constancy in Diagonal Chromaticity Space", IEEE Computer Society: Proccedings of the fifth International Conference on Computer, p. 218–223, (1995); and, K. Barnard, "Computational Color Constancy: Taking Theory into Practice", MSc thesis, Simon Fraser University, School of Computing (1995). These methods fail because they make assumptions about images which do not in general hold: the average of a scene is not always gray, and specularities may or may not appear in images (and when specularities do appear they are not easily found). Each of the methods is easily discredited.

That these methods fail has inspired other authors to search for color constancy algorithms which are based only on weak (that is reasonable) scene assumptions. Forsyth developed a theory of estimation based solely on the observation that the range of colors measured by a camera (or the eye) depends on the color of the light (the reddest red color cannot occur under the bluest light). See, D. Forsyth, "A Novel Algorithm for Color Constancy", IJVC (5), p. 5–36, (1990). This idea was refined by Finlayson (the Color in Perspective method) who observed that illuminant color is itself quite restricted. See, G. D. Finlayson and S. Hordley, "Selection for Gamut Mapping for Color Constancy", Proceedings of the British Machine Vision Conference, to appear (1997).

The invention described here is an improvement on an earlier technique to determine the color of illumination in a scene. See, G. D. Finlayson, "Color in Perspective", IEEE Transactions on Pattern Analysis and Machine Intelligence, p. 1034–1038, (1996). Color by Correlation not only performs significantly better than other methods but is a simple, elegant solution to a problem that has eluded scientists working on color for over a century. See, e.g., H. von Helmholtz Handbuch der Physiologischen Optik (2nd ed.), Voss, Hamburg, (1896).

Because the Color in Perspective method is the closest precursor to the correlation method presented here, it is worth reviewing the details of how it works. In a preprocessing stage, Color in Perspective calculates models of plausible surface colors and plausible illuminant colors.

These correspond to bounded regions of chromaticity space. A chromaticity image, of many surfaces viewed under a single scene illuminant, must be simultaneously consistent with both these constraint sets. That is, solving for color constancy amounts to a constraint satisfaction task; the output of Color in Perspective is the set of possible estimates of the white-point in an image. The mathematics of how Color in Perspective solves the constraint task is somewhat laborious (it involves calculating and intersecting many convex constraint sets). In addition, the method is highly sensitive to spurious inconsistencies. For example the presence of an aperture color in an image can force the solution set to be empty. The correlation method presented in this paper can be used to calculate the Color in Perspective constraint set. However, the new method is very much simpler (faster!) and is also more robust (is not sensitive to spurious outliers).

Adopting only the weak assumptions made in the Forsyth and Finlayson methods makes it impossible to return a unique estimate of the white point. Rather, a range of possible answers is returned, any one of which might be possible. Of course a single estimate must still be chosen from this set, and a variety of estimators have in fact been proposed for this task. Forsyth suggests that after white-balancing (discounting any color biases due to illumination), the image colors should be as colorful as possible. Finlayson and Hordley (repeat-G. D. Finlayson and S. Hordley, "Selection for Gamut Mapping for Color Constancy", Proceedings of the British Machine Vision Conference, to appear (1997)) propose the mean as a more robust estimate, and D'Zmura and Iverson (and Brainard and Freeman) suggest a maximum likelihood estimation. See, M. D'Zmura, G. Iverson and B. Singer, "Probabilistic Color Constancy", in Geometric Representations of Perceptual Phenomena: Papers in Honor of Tarow Indow's 70th birthday, ed. R. D. Luce et al, Lawrence Erlbaum Associates, (1994); and, D. H. Brainard and W. T. Freeman, "Bayesian Method for Recovering Surface and Illuminant Properties from Photosensor Responses", in Human Vision, Visual Processing, and Digital Display V, p. 364 (1994). The latter estimator is particularly relevant to this work because our proposed solution can, as a special case, also support the maximum likelihood case. However, unlike the D'Zmura and Iverson method, our solution is computationally simple. Our method is so simple that maximum likelihood estimation can be provided at video frame rate.

The key observation that we exploit in our method is that the number of colors, and the range of white-points that a camera can sense, is finite. That is the white-point estimation is an intrinsically discrete problem. Funt et al. recently proposed white-point estimation as a discrete neural computation problem. See, B. V. Funt, V. Cardei and K. Barnard, "Learning Color Constancy", 4th IS&T and SID Color Imaging (1996). Here, image chromaticities are fed into a "trained" neural network which then returns a white-point estimate as output. Unfortunately, this method works as a "black-box" and so one cannot say too much about the estimates that are made, such as the estimate confidence. Moreover, physically impossible estimates can also be made.

Thus, it can be seen that illuminant estimation techniques impose color correction, processing speed, robustness and image quality limits upon color digital imaging processing devices, and hinder the use of these devices in many applications.

Therefore, there is an unresolved need for an illuminant estimation technique that can improve color digital imaging quality by quickly, accurately and robustly estimating illuminant information associated with a color digital image in order to correct color of the image based on the illuminant.

SUMMARY OF THE INVENTION

A process and apparatus is described to improve color digital imaging quality by quickly, accurately and robustly estimating illuminant information associated with a color digital image in order to correct color of the image based on the illuminant.

The new approach described here is to use a "correlation matrix memory" or "associative matrix memory" which will not only achieve identical results to the Color in Perspective method, but will improve the Color in Perspective method by adding correlation statistics to the process, e.g., Bayesian statistics. The new method is insensitive to aperture colors and, in the case of an image which has few illuminant colors, the new algorithm provides an effective framework on top of which estimation might be tackled. It can, for example, effortlessly return the maximum likelihood answer.

In this new method, a correlation matrix memory is built to correlate the data from any picture image to reference images under a range of illuminants. The vertical dimension of the matrix memory (the columns) is a rearrangement of the two dimensional chromaticity space into a raster list of points.

The horizontal dimension corresponds to a similar raster list which is the chromaticities for all possible illuminants as seen by the device. To compute the data for the matrix, a set of reference surface colors are used (these could be a color chart or a set of standard surfaces). For each column (which corresponds to an illuminant), the chromaticities of the reference set are computed. The illuminant is multiplied by the reference surface reflectances and the chromaticities as seen by the imaging device are calculated. Then in the column corresponding to that illuminant, the chromaticities of the points within this reference gamut are turned on—given a value of one, and the others are set to zero. This procedure is repeated for each column corresponding to all possible illuminants.

When a camera, scanner, or the like, produces a picture image, the data is converted to chromaticity and a vector is created corresponding to the values existing in the scene. This vector is similar to the columns in the matrix memory, but contains 1's in the positions of the chromaticities that appear in the image and 0's for chromaticities that do not appear in the image.

This vector is multiplied by each column in the correlation matrix giving a new matrix. In this new matrix, every row that represents a chromaticity that did not exist in the picture image is 0 and the rows representing chromaticities that were in the image have data values of either 0 or 1. Another way of thinking of this is that the rows are turned off or allowed to be left on (as they were in the correlation matrix) depending on the existence of that color in the picture image.

Each column is then summed, and the resulting values form a vector that represents the likelihood of each reference source being the illuminant of the scene. The values in this vector can be plotted on a density plot in the same chromaticity space where each value is plotted at the chromaticity of the illumination for that particular column. From this plot normal statistical methods can be used to estimate the likely illumination of the scene.

It can also be shown that if, instead of summing the columns into a vector, one uses a method where a value of the vector is set to 1, if a 1 exists in the corresponding column, or 0, if the column is all 0's, we would get a raster version of the previous method (giving exactly the same results if the raster were fine).

A major benefit of this new technique is greatly reduced computational requirements, because simple binary matrix algorithms replace complex geometrical calculations.

BRIEF DESCRIPTION OF THE DRAWINGS

The invention will be readily understood by the following detailed description in conjunction with the accompanying drawings, wherein like reference numerals designate like structural elements, and in which:

FIG. 4 is a diagram illustrating application of a correlation matrix to an image vector according to an embodiment of the present invention;

DETAILED DESCRIPTION OF THE INVENTION

Embodiments of the invention are discussed below with reference to FIGS. 1–8. Those skilled in the art will readily appreciate that the detailed description given herein with respect to these figures is for explanatory purposes, however, because the invention extends beyond these limited embodiments.

Figure 1:
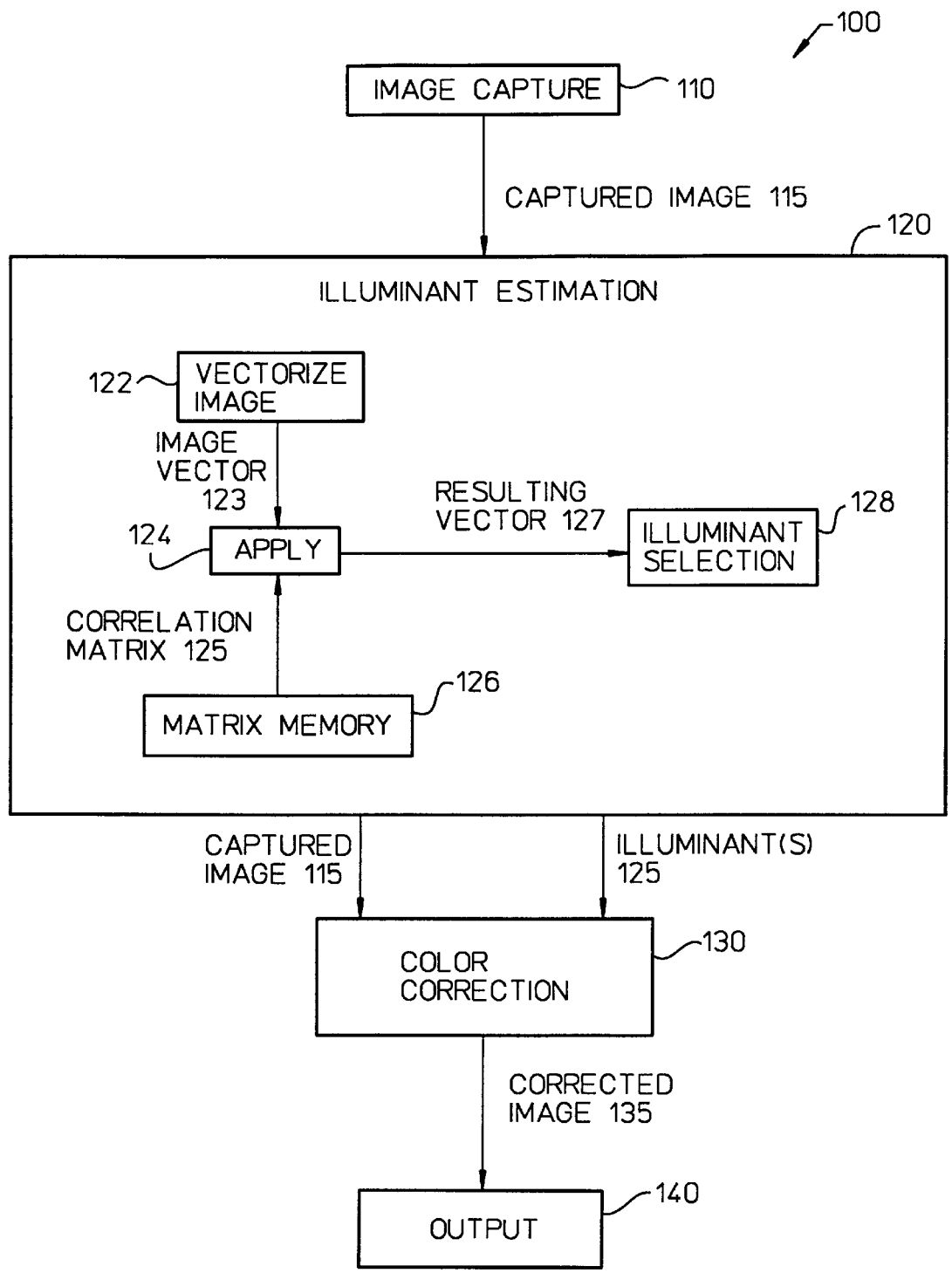
FIG. 1 is a block diagram illustrating a digital imaging system having a correlation matrix memory for illuminant estimation according to the present invention.

FIG. 1 is a block diagram illustrating a digital imaging system 100 that uses a correlation matrix memory for illuminant estimation according to the present invention. It can be seen in FIG. 1 that captured image 115 is provided to illuminant estimation unit 120 from image capture unit 110. The type of illuminant associated with captured image 113 is unknown. Therefore, illumination estimation unit 120 estimates the number and type of illuminants associated with captured image 113. Illumination estimation unit 120 provides the captured image 115 and the identities of estimated illuminant(s) 125 to color correction unit 130. Based upon the estimated illuminant(s) 125, color correction unit 130 corrects the color of captured image 113 to produce corrected image 135. Color correction unit 130 then provides corrected image 135 to output unit 140 for storage, display, printing, or the like.

Figure 2:
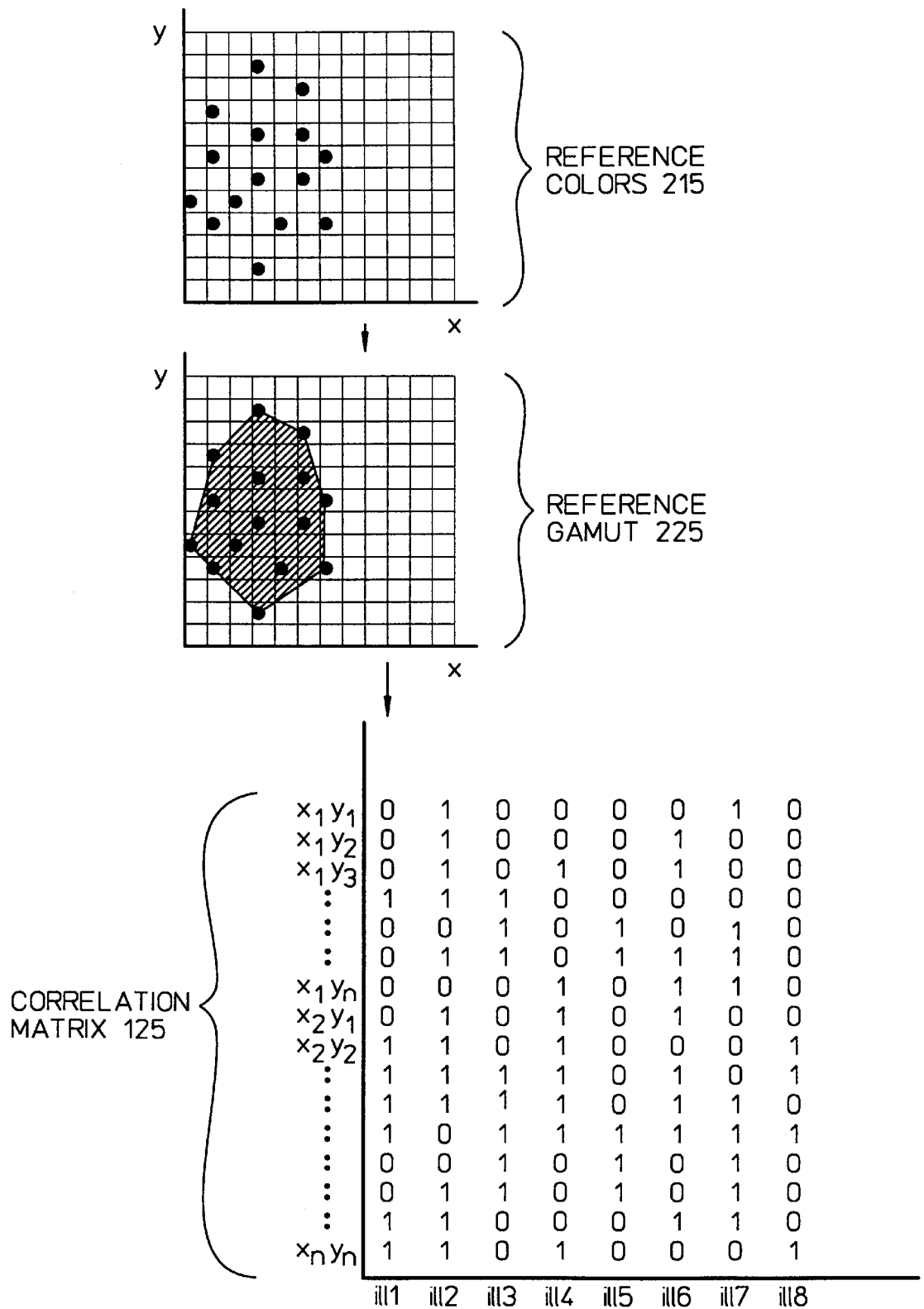
FIG. 2 is a diagram illustrating correlation matrix building according to an embodiment of the present invention.
Figure 3:
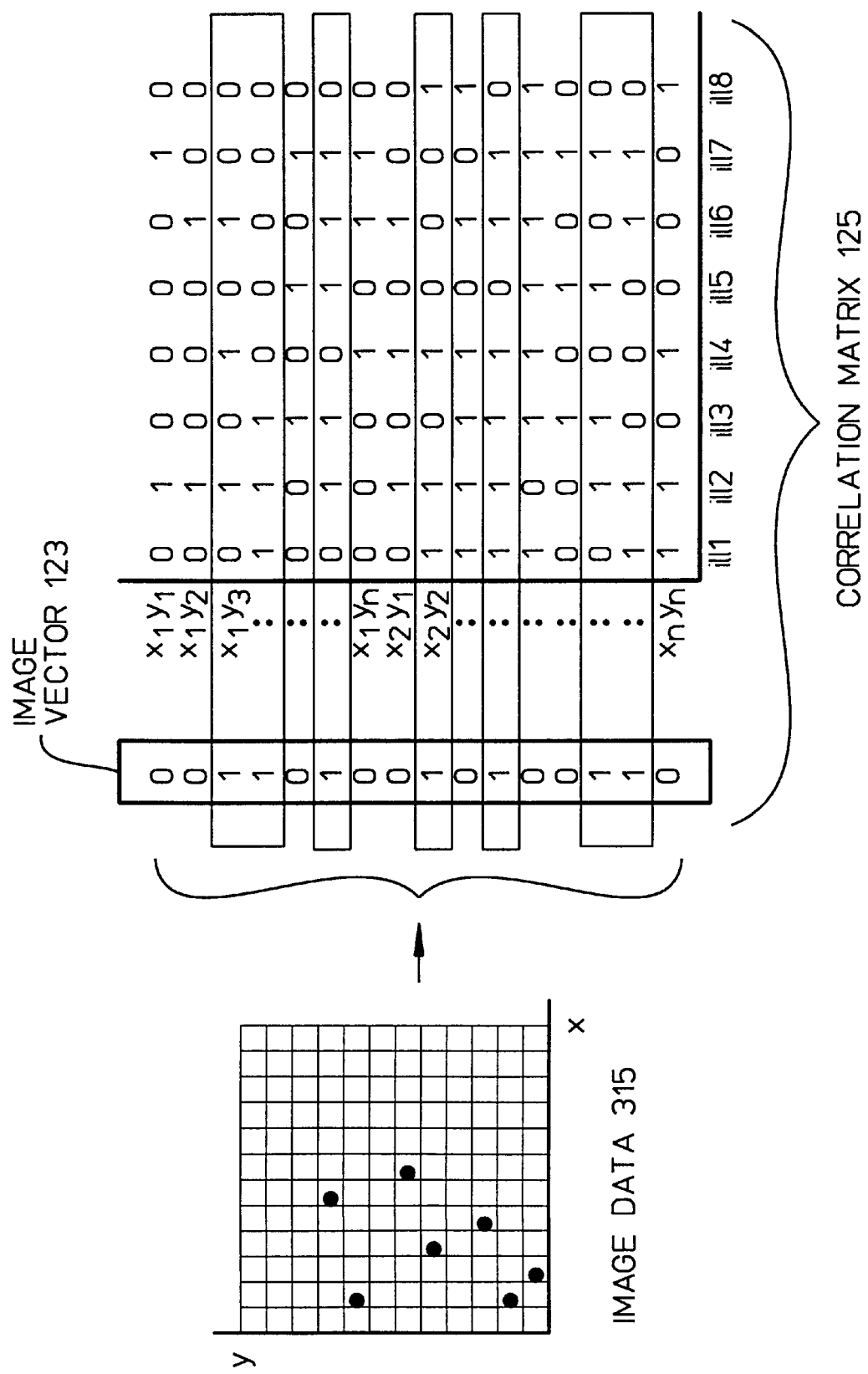
FIG. 3 is a diagram illustrating vectorization of a captured digital image according to an embodiment of the present invention.

The operation of illuminant estimation unit 120 will be described below in greater detail in connection with FIGS. 2–4. Briefly stated, FIG. 2 is a diagram illustrating the building of correlation matrix 125 according to an embodiment of the present invention. Within illuminant estimation unit 120, correlation matrix 125 is stored in correlation matrix memory 126. FIG. 3 is a diagram illustrating vectorization 122 of a captured digital image 115 to form image vector 123. Similarly, FIG. 4 is a diagram illustrating application 124 of correlation matrix 125 to image vector 123 to yield resulting vector 127. In turn, illuminant selection unit 128 operates on resulting vector 127 to estimate the number and type of illuminants associated with captured image 113.

Imaging system 100 may be a single, integrated unit, or may be formed from discrete components, either singly or in combination. Image capture unit 100 can be any of the wide variety of image capture units including a digital camera (still or video), or a scanner. As used herein, the term "capture" is applied broadly. Thus, for example, within the context of this description, captured image 115 can be a computer-generated image that was formed using one or more computer-simulated light sources.

In the case of a scanner, the illuminant information associated with captured image 115 may be unknown for many reasons. For example, it may be the case that captured image 115 is a scanned photograph. Hence, even though the type of illuminant associated with the scanner may be known, the type of illuminant used to take the photographed that was scanned may be unknown. For another example, it may be the case that illuminant estimation unit 120 is separate from image capture unit 110. In such a case, the actual type of scanner (and its associated illumination type) may be unknown.

In accordance with the present invention, the captured image 115 is analyzed to determine how to adjust the digital values in the image data to correct for differences in the characteristics of the light source used to illuminate the image. The analysis and correction involves mathematical manipulation of the image data, which can be performed by a programmable device, such as a microprocessor or digital signal processor, either within, or external to the input capture device 100 (e.g., in a host computer, or in the output unit 12O). Furthermore, the components of digital imaging system 100 are described as examples of devices which perform particular functions within a digital imaging system. Accordingly, the functions which are described as being performed within the digital imaging system may be performed by any device that is capable of performing the particular functions. For example, the illuminant estimation unit 120 may be a microprocessor, an application specific integrated circuit, a discrete circuit, a state machine, or any other circuit or component that is capable of performing the functions that are described.

Our invention employs a new theory of color constancy, Color by Correlation, to solve for the white-point in images by exploiting the correlation that exists between image colors and scene illuminants. For example, because the reddest red camera measurement can only occur under the reddest red light, we say that the reddest camera measurement correlates strongly with the reddest light. Importantly all camera measurements correlate to a greater or lesser degree with different colors of light. By examining the correlation between all image colors and all lights, we show that it is possible to make a very accurate estimate of the color of the scene illuminant.

Color by Correlation

The new technique described here uses a "correlation matrix memory" or "associative matrix memory" which will not only achieve equivalent results to the Color in Perspective method, but will improve the method by adding Bayesian statistics to the process.

In this new method, a correlation matrix memory is built to correlate the data from any image (for example, a RGB image from a digital camera) to the set of possible scene illuminants. FIG. 2 is a diagram illustrating correlation matrix building according to an embodiment of the present invention. To build a correlation matrix memory: a) first a set of reference surfaces illuminated by a particular source are plotted in chromaticity space, then b) by taking the convex hull of these chromaticities, we obtain the reference gamut for this illuminant, and finally c) a rearrangement of the chromaticities are listed in the matrix where 1 denotes the presence of the chromaticity in the reference gamut and 0 denotes its absence.

The vertical dimension of the matrix memory (the columns) is a rearrangement of the two-dimensional chromaticity space into a list of binary (1-0) points. For a particular color (formed under a particular illuminant), a point (chromaticity coordinate) is set to 1 if and only if that color can occur under that illuminant. For example, the reddest red chromaticity can only occur under the reddest illumination. The horizontal dimension corresponds to a list which corresponds to all plausible illuminants as seen by the device. To compute the data for the matrix, a set of reference surface colors are used (these could be a color chart or a set of standard surfaces). For each column (which corresponds to an illuminant), the chromaticities of the reference set are computed: the illuminant is multiplied by the reference surface reflectances, and the chromaticities as seen by the imaging device are calculated (reference colors 215 under the illuminant). The reference gamut 225 for this illuminant is simply the polygon found when we take the convex hull of the points. Then in the column corresponding to that illuminant, the chromaticities of the points within this reference gamut are turned "on" (set to 1), and the others are turned "off" (set to 0). In correlation matrix 125 of FIG. 2, the first column of the matrix corresponds to the shaded polygon, which contains the chromaticities of the reference gamut 225 under illuminant 1. This procedure is repeated for each column corresponding to all the illuminants. In practice, the number of illuminants can be limited to the precision of the desired results. For example we may want to choose an illuminant from a group of 10 sources.

The above steps depend on the spectral sensitivities of the detector, the reference surfaces, and the illuminants, all of which are known for the reference image. This procedure may be performed as part of the design or calibration of the imaging device. No assumption need be made of device linearity nor of spectral basis.

Estimating the White Point

After the correlation matrix has been built, image data is then plotted in the same chromaticity space and a list of these chromaticities is listed in vector form. FIG. 3 is a diagram illustrating vectorization of a captured digital image according to an embodiment of the present invention. When the camera produces an image, the RGB data 315 is converted to chromaticities and a vector is created corresponding to the values existing in the scene (image vector 123 in FIG. 3). This vector is similar to the columns in the correlation matrix 125, but contains 1's in the positions of chromaticities that appear in the image and 0's for chromaticities that do not appear in the image.

FIG. 4 is a diagram illustrating application of a correlation matrix to an image vector according to an embodiment of the present invention. We multiply the image vector 123 with each column in the correlation matrix 125 to produce sum vector 427B. Intermediate matrix 427A illustrates the intermediate results when calculating sum vector 427B. In the intermediate matrix 427A, every row that represents a chromaticity that did not exist in the image contains all zeros, and the rows representing chromaticities that were in the image have data values of either 0 or 1 (a 1 indicates that a particular image chromaticity is consistent with a particular illuminant, and a 0 indicates inconsistency). Another way of thinking of this is that the rows are turned "off" or allowed to be left "on" (as they were in the correlation matrix) depending on the existence of that color in the image. That is, multiplication of the image vector by the rows in the correlation matrix turns "on" the rows that exist in the image and turns "off" the rows corresponding to non-image chromaticities.

Thus, a cumulative correlation scheme is implemented wherein each column of intermediate matrix 427A is summed, and the resulting values form sum-vector 427B that represents the number of image chromaticities which are consistent with a given illuminant.

In our example, the image vector has 7 components equal to 1 and the sum-vector is:

4 7 5 3 2 4 4 1

It is apparent that 4 of the input colors are consistent with the first illuminant, 7 with the second, 5 with the third, and so on. The second illuminant is consistent with all 7 input colors, and so is the correct answer.

Ideally, if there are 7 input colors, we should threshold the sum-vector at a value 7, so applying this threshold results in the binary vector:

0 1 0 0 0 0 0 0.

Notice only the second component is 1, and this indicates that all input colors are consistent with the second illuminant. In practice, however, a threshold which is less than 7 might be chosen (because aperture colors will not in general be consistent with other image colors). Thus, in this case, we find the illuminant that is most consistent with the input colors.

The operation of the technique depicted in FIGS. 3 and 4 can also be described as follows:

If M is the correlation matrix, v is the vector chromaticity representation of the image, and $v^t$ is the transpose of v, then the sum-vector in FIG. 4 is simply:

$v^t M$

Adding Probability

Interestingly, if the matrix M has elements set to 1, then this can be shown to be a very special incarnation of the Bayesian statistical model. Specifically, all colors under a particular illuminant are assumed to be equally likely, as are the illuminants themselves. This is also equivalent to the previous Color in Perspective method (i.e., the equivalence is true for the case where the threshold value is equal to the total number of image chromaticities).

Figure 5:
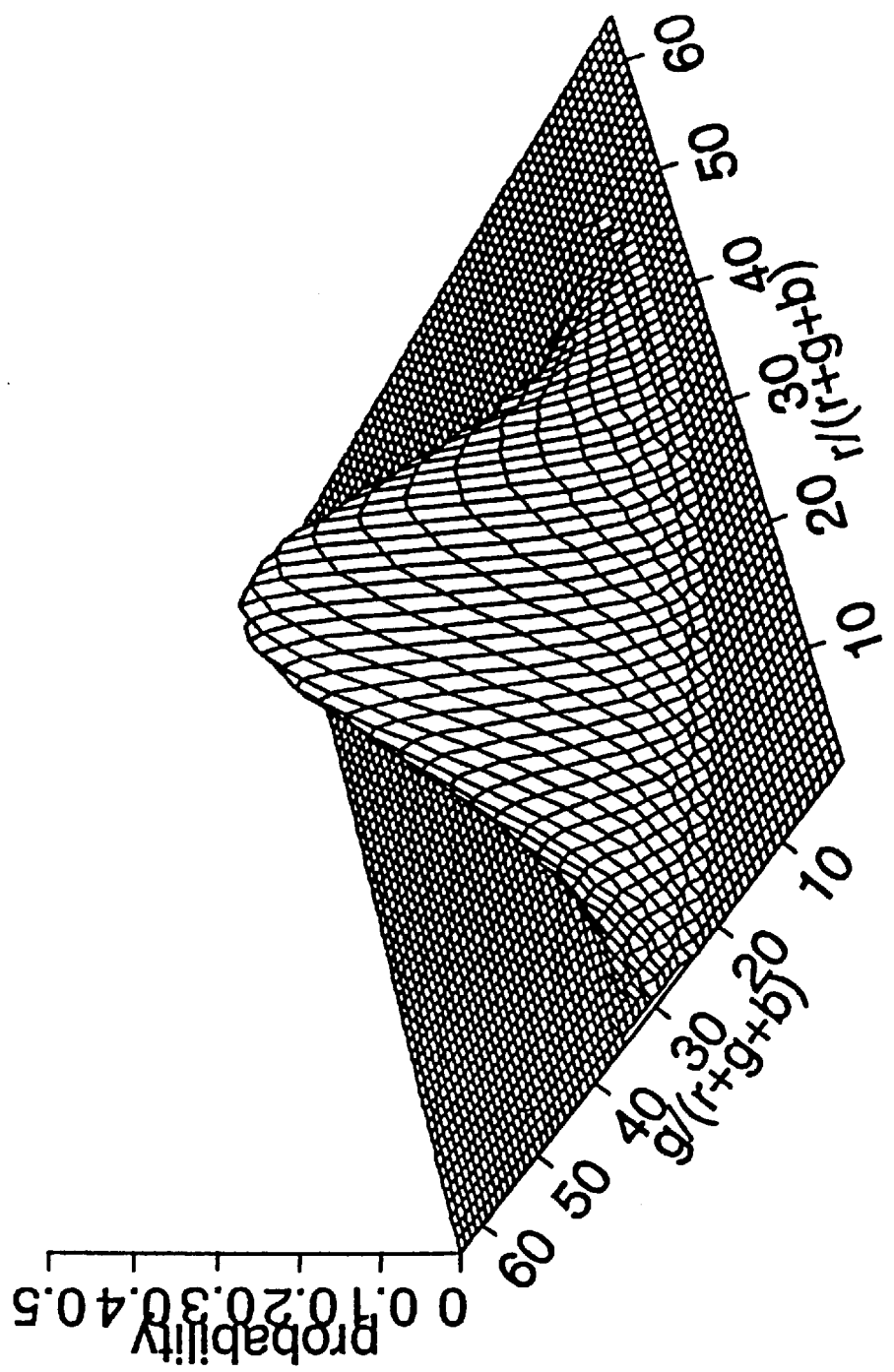
FIG. 5 is a diagram illustrating an example of a probability distribution of the chromaticity I occurring under illuminant j: $p(I|j)$.

Given experimental data, we can update the correlation memory to exploit the full power of Bayesian statistics. Remember that the element at row I and column j of the correlation matrix memory is set to 1 if the Ith image chromaticity is consistent with the jth illuminant. Let us suppose that we know the probability that chromaticity I occurs under illuminant j: p(I|j) (this is easily determined experimentally or from a theoretically determined distribution—FIG. 5 illustrates one such distribution, that is, FIG. 5 illustrates a probability distribution of the chromaticity I occurring under illuminant j: p(I|j).). Then Bayes' rule allows us to calculate the probability of illuminant j given the fact that chromaticity I appears in an image: p(j|I). Assuming independence of the surface reflectances that could appear in a scene, the probability of illuminant j given image chromaticities I and a second image chromaticity, k, is proportional to: p(j|I)p(j|k). Denoting log probabilities as p' then p(j|I)p(j|k) becomes p'(j|I)+p'(j|k).

If we initialize the position i,j in the correlation matrix to the value p'(j|I), then the correlation matrix memory approach can be used to find the most probable estimate of white. In this framework the maximum value in sum-vector corresponds to the most likely illuminant.

Alternate Embodiments

It should be noted that alternate embodiments may be implemented without departing from the spirit of the invention. For example, one of the illuminants in the correlation matrix may be a strobe flash. One can then examine the likelihood that the strobe flash was one of the illuminants in a particular image to determine whether or not a strobe flashed was used (or operated properly) when capturing the image. Based on this information, one could perform other processing besides color correction. For example, if one knew that a strobe flash was used, one could automatically correct the image for undesirable effects commonly associated with flash pictures (such as removing red eyes or compensating for overexposure of objects close to the flash).

Experiments

We evaluated our new algorithm by testing it on a large number of synthetic images generated by taking a random subset of surface reflectances from the Munsell set. Though we have also tested our algorithm on real digital camera images, (and observed equally good performance) these synthetic images have the advantage of allowing us to test our algorithm quickly on hundreds of different images and to compare our technique easily to other approaches, such as Color in Perspective and Gray World.

It should be emphasized here that these tests favor methods such as Gray World—a random sampling of the Munsell surfaces do average to gray, if enough surfaces are considered. Therefore we expect the Gray World approach to converge to the correct answer. If we obtain better estimation of the illumination than the Gray World approach in this framework, we would expect considerably greater superiority, if we were to test more realistic situations where we know the Gray World approach would fail.

To form an image we require three components: surface reflectances, illumination, and sensors. For our experiments, we randomly selected surface reflectances from a set of 462 Munsell chips (see, Newhall, Nickerson and D. B. Judd "Final Report of the {OSA} Subcommittee on the Spacing of the Munsell Colors", J. Opt. Soc. Am. (33) p. 385–418, (1943)). The results below show how the algorithm performed when given images of between 5 and 25 surface reflectances. We selected an illuminant for each image from a set of common illuminants. These included Judd's daylights (see, D. B. Judd, D. L. MacAdam and G. Wyszecki, "Spectral Distribution of Typical Daylight as a Function of Correlated Color Temperature", J. Opt. Soc. Am. (54) p. 1031–1040 (1964)), together with a variety of tungsten and fluorescent lights. Finally, for our sensors, we used three reasonably narrow band digital camera sensors.

Given a surface reflectance $S(\lambda)$, an illuminant spectral power distribution $E(\lambda)$, and a set of sensor spectral sensitivities $R_k(\lambda)$, a sensor response $P_k$ is given by:

$$P_k = \int \{S(\lambda)E(\lambda)R_k(\lambda)\} \, d\lambda.$$

The set of sensor responses generated in this way form the synthetic image which is the input to our algorithm.

Before running our algorithm, we precompute the probability distributions described in the previous section, for each of our possible illuminants. For a given image, the algorithm calculates chromaticities, and uses these values together with the probability distributions, to generate a likelihood for each illuminant. Once we have computed a probability for each illuminant, we can choose our estimate of the illuminant in a number of ways: we can choose the maximum likelihood, the mean likelihood, or a local area mean. In the case of the Color in Perspective method—where all surfaces are deemed equally probable—we want to use a mean selection.

Results

Figure 6:
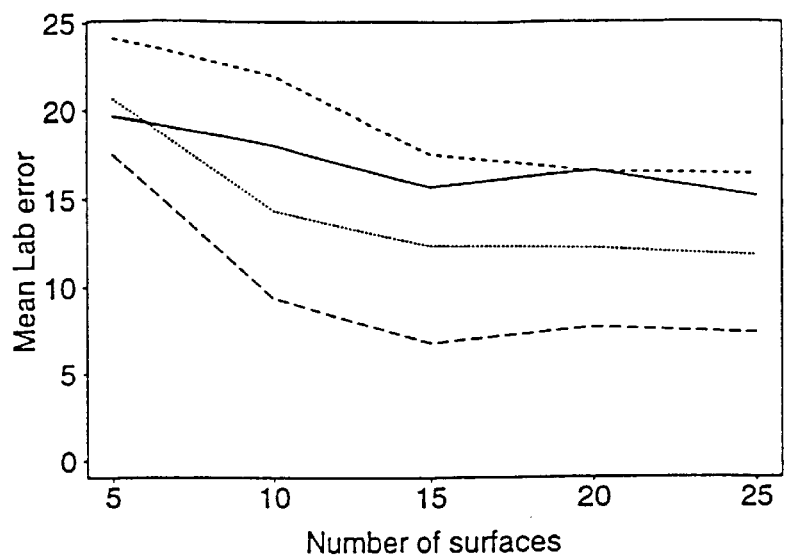
FIG. 6 is a diagram illustrating an example of the mean CIELab delta E difference between the estimated illuminant and the known illuminant (i.e., the correct answer), versus the number of surfaces in synthetic test images for the Gray World algorithm (solid line), Max.RGB (dotted line), Color in Perspective (short dashed line) and an embodiment of the present invention (long dashes)

FIG. 6 is a plot of mean CIELab delta E difference between the estimated illumination color and the correct illumination color for synthetic images created using random collections of Munsell surfaces under 32 different illuminants. Thus, FIG. 6 plots the mean CIELab delta E errors between the estimated illuminant and the known illuminant (i.e., the correct answer), versus the number of surfaces in the test image. Each data point used to generate the curves is an mean of 100 estimates. The solid line summarizes the Gray World algorithm performance, dotted line for the Max.RGB (Retinex type) method, short dashed line for Color in Perspective and long dashes for the new algorithm being proposed. Similar denotations are used in FIGS. 7 and 8.

Figure 7:
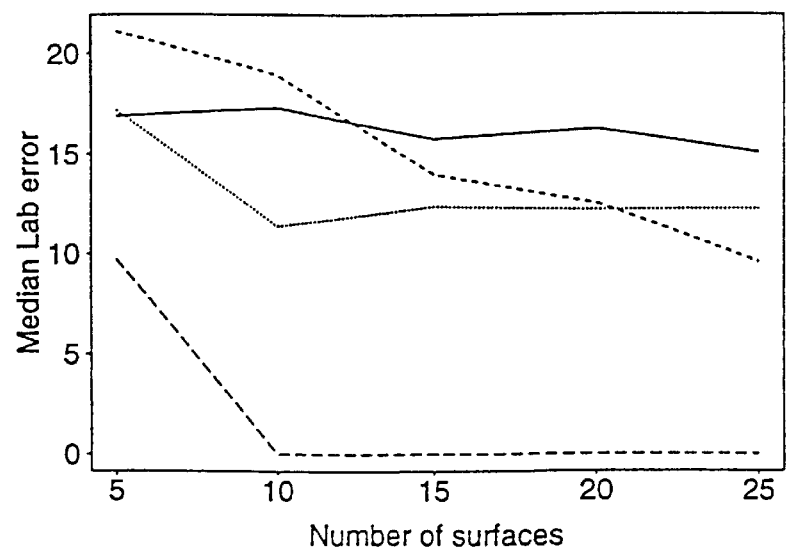
FIG. 7 is a diagram illustrating the median CIELab delta E difference for the same data as in FIG. 6; and, FIG. 8 is a diagram illustrating the percentage of times the given methods produce an illuminant estimate within 5 CIELab deltae units of the correct answer, as a function of the number of surfaces in the image, for the same data as in FIGS. 6 and 7.
Figure 8:
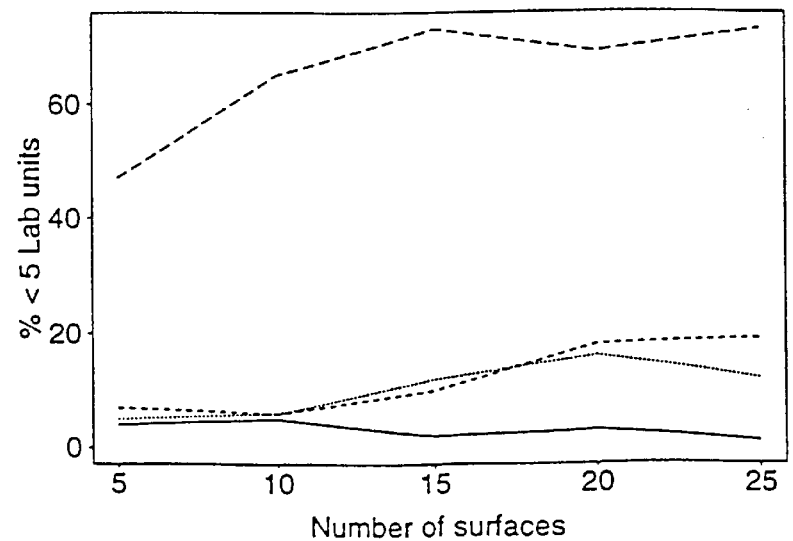

FIG. 7 is a plot of median CIELab delta E difference from the same data shown in FIG. 6. When we plot the median CIELab error, the Gray World and Max. RGB methods give similar results as before, but the Color in Perspective methods decreases, and the Color by Correlation method drops to zero after only ten surfaces—which means that over half of the estimates calculated are perfect. FIG. 8 is a set of curves which show the percentage of times the given methods provide an illuminant estimate within 5 CIELab deltae units of the correct answer, as a function of the number of surfaces in the image. The Color by Correlation gives much better performance than the other techniques, even when only a few surfaces are contained in the image.

Clearly the correlation matrix technique performs considerably better than the other methods. Certain illuminants perform extremely well (tungsten), and some illuminants are more difficult to distinguish due to their similarity to neighboring illuminants (D65 and D75). Yet, our experience has been that in all cases, the correlation matrix gives a smaller error.

Conclusions

Color by Correlation is a simple and elegant solution to the color constancy problem, that gives consistently better results than other methods. Because the method is based on constraints of possible illuminants, in addition to probability and other correlation statistics, it exploits the advantages of several previous techniques without their disadvantages (Gray World failure, for example).

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for a captured image, the captured image being a color digital image having an associated illuminant of unknown color, the process comprising the steps of:

forming an image vector based on chromaticities associated with the captured image;

applying the image vector to a correlation matrix to form a resulting vector, the correlation matrix having a first dimension corresponding to a set of candidate illuminants and having a second dimension corresponding to chromaticities; and based on the resulting vector, selecting at least one candidate illuminant from the set of candidate illuminants to be the associated illuminant of unknown color.

2. The process as set forth in 1, wherein the image vector has positions, each of the positions corresponding to a particular chromaticity and wherein the step of forming an image vector includes the substeps of:

converting RGB data from the captured image to chromaticities;

setting a particular position of the image vector to a first value if the chromaticity corresponding to the particular position appears in the captured image; and setting the particular position of the image vector to a second value if the chromaticity corresponding to the particular position does not appear in the captured image.

3. The process as set forth in 2, wherein the first value is one and the second value is zero.

4. The process as set forth in 1, wherein the step of applying the image vector to the correlation matrix involves matrix multiplication of the image vector and the correlation matrix.

5. The process as set forth in 1, wherein the step of applying the image vector to the correlation matrix involves matrix multiplication of the image vector and the correlation matrix to form a sum-vector as the resulting vector.

6. The process as set forth in claim 5, wherein the step of selecting at least one candidate vector involves applying a threshold to the sum-vector.

7. The process as set forth in claim 5, wherein the sum-vector represents likelihoods of each the candidate illuminants being the unknown illuminant.

8. The process as set forth in claim 1, wherein for a particular candidate illuminant chromaticity, coordinates of the correlation matrix are obtained by the steps of:

illuminating a set of reference surfaces with the particular candidate illuminant and computing chromaticities for the reference surfaces;

finding a convex hull of the chromaticities for the reference surfaces to form a reference gamut for the particular candidate illuminant; and for each chromaticity of the second dimension, setting the chromaticity coordinate for the particular candidate illuminant to a first value if the chromaticity is present in the reference gamut, and setting the chromaticity coordinate for the particular candidate illuminant to a second value if the chromaticity is not present in the reference gamut.

9. The process as set forth in 8, wherein the first value is one and the second value is zero.

10. The process as set forth in 1, comprising the step of capturing the captured image.

11. The process as set forth in 1, comprising the step of using the associated illuminant obtained from the step of selecting at least one candidate illuminant to process the captured image and thereby form a color corrected image.

12. The process as set forth in 11, comprising the step of outputting the color corrected image.

13. The process as set forth in 1, comprising the step of using the associated illuminant obtained from the step of selecting at least one candidate illuminant to detect whether the unknown illuminant is a flash device.

14. The process as set forth in 13, comprising the step of adjusting the captured image to compensate for flash effects if the flash device was detected.

15. A processor for a captured image, the captured image being a color digital image having an associated illuminant of unknown color, the processor comprising:

means for forming an image vector based on chromaticities associated with the captured image;

means for applying the image vector to a correlation matrix to form a resulting vector, the correlation matrix having a first dimension corresponding to a set of candidate illuminants and having a second dimension corresponding to chromaticities; and means for selecting, based on the resulting vector, at least one candidate illuminant from the set of candidate illuminants to be the associated illuminant of unknown color.

16. The process as set forth in 15, wherein the image vector has positions, each of the positions corresponding to a particular chromaticity and wherein the means for forming an image vector includes:

means for converting RGB data from the captured image to chromaticities;

means for setting a particular position of the image vector to a first value if the chromaticity corresponding to the particular position appears in the captured image; and for setting the particular position of the image vector to a second value if the chromaticity corresponding to the particular position does not appear in the captured image.

17. The processor as set forth in 16, wherein the first value is one and the second value is zero.

18. The processor as set forth in 15, wherein applying the image vector to the correlation matrix involves matrix multiplication of the image vector and the correlation matrix.

19. The processor as set forth in 18 wherein applying the image vector to the correlation matrix involves matrix multiplication of the image vector and the correlation matrix to form a sum-vector as the resulting vector.

20. The processor as set forth in claim 19, wherein selecting at least one candidate vector involves applying a threshold to the sum-vector.

21. The processor as set forth in claim 19, wherein the sum-vector represents likelihoods of each the candidate illuminants being the unknown illuminant.

22. The processor as set forth in claim 15, wherein for a particular candidate illuminant chromaticity, coordinates of the correlation matrix are obtained by the steps of:

illuminating a set of reference surfaces with the particular candidate illuminant and computing chromaticities for the reference surfaces;

finding a convex hull of the chromaticities for the reference surfaces to form a reference gamut for the particular candidate illuminant; and for each chromaticity of the second dimension, setting the chromaticity coordinate for the particular candidate illuminant to a first value if the chromaticity is present in the reference gamut, and setting the chromaticity coordinate for the particular candidate illuminant to a second value if the chromaticity is not present in the reference gamut.

23. The processor as set forth in 22, wherein the first value is one and the second value is zero.

24. The processor as set forth in 15, comprising means for capturing the captured image.

25. The processor as set forth in 15, comprising color correction means for processing the captured image and thereby forming a color corrected image using the associated illuminant obtained from the means for selecting at least one candidate illuminant.

26. The processor as set forth in 25, comprising means for outputting the color corrected image.

27. The processor as set forth in 15, comprising a flash detector that uses the associated illuminant obtained from the step of selecting at least one candidate illuminant to detect whether the unknown illuminant is a flash device.

28. The processor as set forth in 27, comprising a flash compensator to adjust the captured image to compensate for flash effects if the flash device was detected.

* * * * *